United States Patent Office 3,758,461
Patented Sept. 11, 1973

3,758,461
DYES AND PHOTOGRAPHIC MATERIALS
Arthur Fumia, Jr., Hilton, Leslie G. S. Brooker, Rochester, N.Y., assignors to Eastman Kodak Company, Rochester, N.Y.
No Drawing. Application Mar. 25, 1970, Ser. No. 22,708, which is a continuation-in-part of application Ser. No. 860,395, Sept. 23, 1969, now abandoned. Divided and this application July 9, 1971, Ser. No. 161,333
Int. Cl. C09b 23/00
U.S. Cl. 260—240.1          5 Claims

ABSTRACT OF THE DISCLOSURE

Novel tricarbocyanine dyes are provided having a 1-piperazinyl group attached to the meso carbon atom of the methine linkage of the dye. Light sensitive silver halide grains are spectrally sensitized with the tricarbocyanine dyes of this invention.

---

This application is a division of our copending application Ser. No. 22,708 filed Mar. 25, 1970, now U.S. Pat. 3,623,881 issued Nov. 30, 1971, which is a continuation-in-part of Ser. No. 860,395 filed Sept. 23, 1969, now abandoned.

This invention relates to tricarbocyanine dyes and to light sensitive silver halide grains spectrally sensitized with tricarbocyanine dyes.

It is well known that carbocyanine dyes containing an amino group on the meso carbon atom are useful filter dyes and spectral sensitizers for photographic silver halide emulsions. For example, in Kendall et al., U.S. Pat. No. 2,705,234, issued Mar. 29, 1955, and in Brooker et al., U.S. Pat. No. 2,735,770, issued Feb. 1, 1956, a number of carbocyanine dyes of the above type are described and shown to extend the sensitivity of ordinary silver halide emulsions up to a range of about from 530 to 685 m$\mu$. This sensitivity range is satisfactory for some photographic uses, but insufficient for other uses such as for red and infrared photographic applications. It would, therefore, be highly desirable to provide carbocyanine dye-sensitized silver halide emulsions to longer wavelength radiations, for example, substantially above 700 m$\mu$.

It is accordingly, one object of this invention to provide tricarbocyanine dyes.

Another object of this invention is to provide light sensitive silver halide grains sensitized with tricarbocyanine dyes.

A further object of this invention is to provide dyes which are effective spectral sensitizers for light sensitive silver halide.

Still another object of this invention is to provide silver halide spectrally sensitized to infrared radiation.

Another object of this invention is to provide infrared sensitive silver halide emulsions which retain high sensitivity to infrared radiation on storage.

Other objects of this invention will become apparent from a consideration of this disclosure and the appended claims.

In accordance with one embodiment of this invention, novel tricarbocyanine dyes are provided having a 1-piperazinyl group attached to the meso carbon atom of the methine linkage of the dye.

In another embodiment of this invention, light sensitive silver halide grains are spectrally sensitized with a tricarbocyanine dye having a 1-piperazinyl group attached to the meso carbon atom of the methine linkage of the dye.

The tricarbocyanine dyes of this invention are outstanding spectral sensitizers for light sensitive silver halide grains. These new dyes sensitize such emulsions over a broader wavelength range, as compared with the closest related cyanine dyes, of about from 560 to 850 m$\mu$, and even higher in some instances, with maximum sensitivities generally ranging from about 730 to 800 m$\mu$. Further, our new class of tricarbocyanine dyes are especially efficient sensitizers for the red and near infrared region of the spectrum and, in general, are characterized by a very low fog level in emulsions, both fresh and on incubation.

The most useful tricarbocyanine dyes of this invention comprise first and second 5- or 6-membered nitrogen containing heterocyclic nuclei of the type employed in cyanine dyes, said nuclei being joined together by a straight chain linkage containing seven methine groups, said dye having a 1-piperazinyl group attached to the meso carbon atom of said linkage. Especially good results are obtained when the carbon atoms of the two methine groups adjacent the meso carbon atom of the methine linkage are joined by an ethylene linkage; the 1-piperazinyl group is a 4-(lower)alkoxycarbonylpiperazin-1-yl group; and, each heterocyclic nucleus of the dye is selected from the group consisting of a benzoxazole nucleus, a benzothiazole nucleus, and a naphthothiazole nucleus.

The preferred tricarbocyanine dyes of this invention are represented by the following general formula:

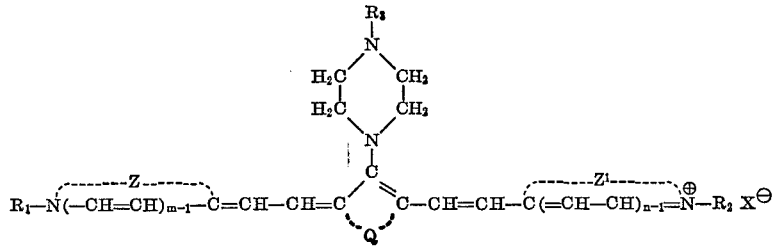

wherein $m$ and $n$ each represents a positive integer of from 1 to 2; $R_1$ and $R_2$ each represents an alkyl group (including substituted alkyl groups) having 1 to 18 carbon atoms such as methyl, ethyl, propyl, isopropyl, butyl, isobutyl, pentyl, hexyl, heptyl, octyl, nonyl, decyl, undecyl, dodecyl, tridecyl, tetradecyl, pentadecyl, hexadecyl, heptadecyl, octadecyl, etc., preferably a lower alkyl group having 1 to 4 carbon atoms, and a substituted alkyl group such as a hydroxyalkyl group such as $\beta$-hydroxyethyl, $\gamma$-hydroxypropyl, $\beta$-hydroxypropyl, $\gamma$-hydroxybutyl, $\omega$-hydroxybutyl, $\omega$-hydroxybutyl, etc., an alkoxyalkyl group such as $\beta$-methoxyethyl, $\beta$-ethoxyethyl, $\beta$-butoxyethyl, $\gamma$-methoxypropyl, $\gamma$-ethoxypropyl, $\omega$-methoxybutyl, $\omega$-ethoxybutyl and $\omega$-butoxybutyl, for example, a carboxyalkyl group such as carboxymethyl, $\beta$-carboxyethyl, $\gamma$-carboxypropyl, $\omega$-carboxybutyl, etc., a sulfoalkyl group such as $\beta$-sulfoethyl, $\gamma$-sulfopropyl, $\gamma$-sulfobutyl, $\omega$-sulfobutyl, etc., a sulfatoalkyl group such as $\beta$-sulfatoethyl, $\gamma$-sulfatopropyl, $\gamma$-sulfatobutyl, $\omega$-sulfatobutyl, etc., an alkanoyloxyalkyl group such as $\beta$-acetoxyethyl, $\beta$-propionyloxyethyl, $\beta$-butyryloxyethyl, $\gamma$-acetoxypropyl, $\gamma$-propionyloxypropyl, $\omega$-acetoxybutyl, $\omega$-propionyloxybutyl, $\omega$-butyryloxybutyl, etc., and an alkoxycarbonylalkyl group such as methoxycarbonylmethyl, $\beta$-methoxycarbonylethyl, β - ethoxycarbonylethyl, γ - methoxycarbonylpropyl, γ - ethoxycarbonylpropyl, ω - methoxycarbonylbutyl, ω-ethoxycarbonylbutyl, etc. or an aralkyl group, e.g., benzyl, phenethyl, etc.; an alkenyl group of from 2 to 4 carbon atoms, e.g., allyl, propenyl, 1-butenyl, 2-butenyl; or any aryl group, e.g., naphthyl, tolyl, ethylphenyl, xylyl, methoxyphenyl, phenyl, chlorophenyl, sulfophenyl or a carboxyphenyl group; $R_3$ represents an alkyl or an aryl group, such as the groups described above for R and $R_1$, with $R_3$ preferably representing an alkoxycarbonyl group in which the alkoxy group contains from 1 to 12 carbon atoms, such as methoxycarbonyl, ethoxycarbonyl, propoxycarbonyl, isopropoxycarbonyl, butoxycarbonyl, pentyloxycarbonyl, hexyloxycarbonyl, decyloxycarbonyl or dodecyloxycarbonyl; Q represents the atoms to complete an ethylene linkage which can be substituted with one, two or more suitable groups, such as an alkyl group having 1 to 4 carbon atoms such as methyl, ethyl, propyl, isopropyl and butyl, a halogen atom such as chlorine or bromine, or an alkoxy group having 1 to 4 carbon atoms, such as methoxy, ethoxy, propoxy, isopropoxy and butoxy, for example; X represents an acid anion, e.g., chloride, bromide, iodide, thiocyanate, sulfamate, perchloroate, p-toluenesulfonate, methyl sulfate, ethyl sulfate, etc. and can be included in R or $R_1$, for example when R or $R_1$ represents a sulfoalkyl or carboxyalkyl group; and, Z and $Z^1$ each represents the nonmetallic atoms required to complete a 5- to 6-membered nitrogen containing heterocyclic nucleus of the type employed in cyanine dyes, such as a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienylthiazole, etc.), a benzothiazole nucleus, (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4 - phenylbenzothiazole, 5 - phenylbenzothiazole, 4-methoxybenzothiazole, 5 - methoxybenzothiazole, 6 - methoxybenzothiazole, 5 - iodobenzothiazole, 6 - iodobenzothiazole, 4 - ethoxybenzothiazole, 5-ethoxybenzothiazole, tetrahydrobenzothiazole, 5,6 - dimethoxybenzothiazole, 5,6 - dioxymethylenebenzothiazole, 5-hydroxybenzothiazole, 6-hydroxybenzothiazole, etc.), a naphthothiazole nucleus, (e.g., naphtho[2,1-d]thiazole, naphtho[1,2-d]thiazole, 5-methoxynaphtho[2,3 - d]thiazole, 5 - ethoxynaphtho[1,2 - d]thiazole, 7 - methoxynaphtho[2,1-d]thiazole, 8-methoxynaphtho[2,1 - d]thiazole, etc.), a thionaphtheno - 7',6',4,5 - thiazole nucleus (e.g., 4' - methoxythianaphtheno-7',6',4,5 - thiazole, etc.), an oxazole nucleus (e.g., oxazole, 4-methyloxazole, 5-methyloxazole, 4 - phenyloxazole, 4,5 - diphenyloxazole, 4-ethyloxazole, 4,5 - dimethyloxazole, 5 - phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6 - dimethylbenzoxazole, 4,6 - dimethylbenzoxazole, 5 - methoxybenzoxazole, 5 - ethoxybenzoxazole, 5-chlorobenzoxazole, 6 - methoxybenzoxazole, 5-hydroxybenzoxazole, 6-hydroxybenzoxazole, etc.) a naphthoxazole nucleus (e.g., α-naphthoxazole, β-naphthoxazole, etc.), a selenazole nucleus (e.g., 4-methylselenazole, 4-phenylselenazole, etc.), a benzoselenazole nucleus (e.g., benzoselenazole, 5-chlorobenzoselenazole, 5 - methoxybenzoselenazole, 5 - hydroxybenzoselenazole, tetrahydrobenzoselenazole, etc.), a naphthoselenazole nucleus (e.g., α-naphthoselenazole, β-naphthoselenazole, etc.), a thiazoline nucleus (e.g., thiazoline, 4-methylthiazoline, etc.), a 2-pyridine nucleus (e.g., 2-pyridine, 5-methyl-2-pyridine, etc.), a 4-pyridine nucleus (e.g., 4-pyridine, 3-methyl-4-pyridine, etc.), a 2-quinoline nucleus (e.g., 2-quinoline, 6-chloro - 2 - quinoline, 8 - chloro - 2 - quinoline, 6-methoxy-2-quinoline, 8-ethoxy - 2 - quinoline, 8-hydroxy-2-quinoline, etc.), a 4-quinoline nucleus (e.g., 4-quinoline, 6-methoxy-4-quinoline, 7-methyl-4-quinoline, 8-chloro-4-quinoline, etc.), a 1-isoquinoline nucleus (e.g., 1-isoquinoline, 3,4-dihydro-1-isoquinoline, etc.), a 3-isoquinoline nucleus (e.g., 3-isoquinoline, etc.), a 3,3-dialkylindolenine nucleus (e.g., 3,3-dimethylindolenine, 5-nitro-3,3 - dimethylindolenine, 6 - nitro - 3,3 - dimethylindolenine, 5-cyano - 3,3 - dimethylindolenine, 6 - cyano-3,3-dimethylindolenine, 3,3,5-trimethylindolenine, 3,3,7-trimethylindolenine, etc.), an imidazole nucleus (e.g., imidazole, 1-methylimidazole, 1-ethylimidazole, 1-butylimidazole, 1-methyl-4-phenylimidazole, 1-methyl - 4,5-dimethylimidazole, etc.), a benzimidazole nucleus, (e.g., benzimidazole, 1-methylbenzimidazole, 1-phenyl-5,6 - dichlorobenzimidazole, etc.), a naphthimidazole nucleus (e.g., 1-methyl-α-naphthimidazole, 1 - ethyl - α - naphthimidazole, 1-butyl-α-naphthimidazole, 1-phenyl-α-naphthimidazole, 1-phenyl-β-naphthimidazole, 1-methyl - 5 - methoxy-α-naphthimidazole, etc.), and a benzindole nucleus such as 1H-benz[e]indole, 3H-benz[f] indole, and 3H-benz[g]indole, for example. When $R_3$ represents an alkyl group it is preferably an alkyl group having 1 to 4 carbon atoms such as methyl, ethyl, propyl, isopropyl and butyl, for example. When $R_3$ represents an alkoxycarbonyl group having 2 to 5 carbon atoms such as methoxycarbonyl, ethoxycarbonyl, propoxycarbonyl isopropoxycarbonyl and butoxycarbonyl, for example.

The new tricarbocyanine dyes of the invention include symmetrical and unsymmetrical tricarbocyanine dyes. The dyes of the invention wherein $R_3$ represents an alkoxycarbonyl group are especially useful as spectral sensitizers having a low fog level and are preferred dyes.

Symmetrical tricarbocyanine dye compounds of the invention in addition to those specifically described in Examples 1–9 below, and which are useful in the practice of this invention, include:

3,3'-dimethyl-10,12-ethylene-11-(4-ethoxycarbonyl-1-piperazinyl)oxatricarbocyanine perchlorate.
3,3'-dibutyl-10,12-ethylene-11-(4-ethoxycarbonyl-1-piperazinyl)oxatricarbocyanine perchlorate.
3,3'-diethyl-10,12-ethylene-11-(4-butoxycarbonyl-1-piperazinyl)oxatricarbocyanine perchlorate.
3,3'-diethyl-10,12-ethylene-11-(4-propyl-1-piperazinyl)oxatricarbocyanine perchlorate.
3,3'-diethyl-10,12-ethylene-11-(4-butyl-1-piperazinyl)oxatricarbocyanine perchlorate.
3,3'-diethyl-10,12-ethylene-11-(4-phenyl-1-piperazinyl)oxatricarbocyanine perchlorate.
3,3'-diethyl-10,12-ethylene-11-(4-propyl-1-piperazinyl)thiatricarbocyanine perchlorate.
3,3'-diethyl-10,12-ethylene-11-(4-butyl-1-piperazinyl)thiatricarbocyanine perchlorate.
3,3'-dimethyl-10,12-ethylene-11-(4-ethoxycarbonyl-1-piperazinyl)thiatricarbocyanine perchlorate.
3,3'-dipropyl-10,12-ethylene-11-(4-ethoxycarbonyl-1-piperazinyl)thiatricarbocyanine perchlorate.
3,3'-dibutyl-10,12-ethylene-11-(4-butoxycarbonyl-1-piperazinyl)thiatricarbocyanine perchlorate.
3,3'-diethyl-10,12-ethylene-11-(4-methyl-1-piperazinyl) selenatricarbocyanine perchlorate.
3,3'-diethyl-10,12-ethylene-11-(4-ethoxycarbonyl-1-piperazinyl)selenatricarbocyanine perchlorate.

The following representative unsymmetrical tricarbocyanine dye compounds are useful in the practice of this invention:

3,3'-diethyl-10,12-ethylene-11-(4-methyl-1-piperazinyl)oxathiatricarbocyanine perchlorate.
3,3'-dibutyl-10,12-ethylene-11-(4-methyl-1-piperazinyl)oxathiatricarbocyanine perchlorate.
3-ethyl-3'-butyl-10,12-ethylene-11-(4-methyl-1-piperazinyl)oxatricarbocyanine perchlorate.
3-ethyl-3'-butyl-10,12-ethylene-11-(4-methyl-1-piperazinyl)thiatricarbocyanine perchlorate.
3,3'-diethyl-10,12-ethylene-11-(4-phenyl-1-piperazinyl)oxathiatricarbocyanine perchlorate.

3,3'-diethyl-10,12-ethylene-11-(4-ethyl-1-piper-
azinyl)oxathiatricarbocyanine perchlorate.
3,3'-diethyl-10,12-ethylene-11-(4-ethoxycarbonyl-1-piper-
azinyl)oxathiatricarbocyanine perchlorate.
3,3'-dibutyl-10,12-ethylene-11-(4-ethoxycarbonyl-1-piper-
azinyl)oxathiatricarbocyanine perchlorate.
3,3'-diethyl-10,12-ethylene-11-(4-methoxycarbonyl-1-
piperazinyl)oxathiatricarbocyanine perchlorate.
3,3'-diethyl-10,12-ethylene-11-(4-butoxycarbonyl-1-
piperazinyl)oxathiatricarbocyanine perchlorate.
3,3'-diethyl-10,12-ethylene-11-(4-methyl-1-piper-
azinyl)oxaselenatricarbocyanine perchlorate.
3,3'-diethyl-10,12-ethylene-11-(4-butyl-1-piper-
azinyl)oxaselenatricarbocyanine perchlorate.
3,3'-diethyl-10,12-ethylene-11-(4-methyl-1-piper-
azinyl)selenathiatricarbocyanine perchlorate.
3,3'-diethyl-10,12-ethylene-11-(4-ethoxycarbonyl-1-
piperazinyl)oxaselenatricarbocyanine perchlorate.
3,3'-diethyl-10,12-ethylene-11-(4-ethoxycarbonyl-1-
piperazinyl)selenathiatricarbocyanine perchlorate.

Typical useful dyes which do not include an ethylene linkage between the carbon atoms of the two methine groups adjacent the meso carbon atom of the methine linkage of the dye include:

anhydro-11-(4-ethoxycarbonylpiperazin-1-yl)-3,3'-
di(3-sulfopropyl)thiatricarbocyanine hydroxide,
triethylamine salt,
11-(4-ethoxycarbonyl-1-piperazinyl)-3,3'-diethyl-
oxatricarbocyanine perchlorate,
3,3'-diethyl-11-(4-phenyl-1-piperazinyl)oxathia-
tricarbocyanine perchlorate.

The symmetrical tricarbocyanine dyes of the invention can be conveniently prepared by condensing a nitrogen heterocyclic compound of the general formula:

(II) 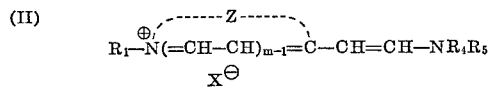

wherein $m$, $R_1$, X and Z are as previously defined, $R_4$ represents a hydrogen atom or an acyl group, e.g., acetyl, propionyl, butyryl, benzoyl, etc., and $R_5$ represents an aryl group, e.g., phenyl, a tolyl group, etc., with an enamine salt of the general formula:

(III) 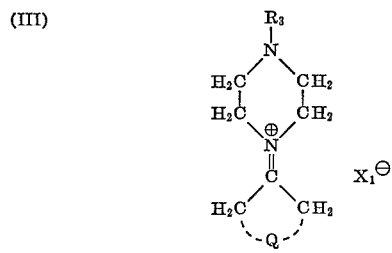

wherein $R_3$ and Q are as previously defined and $X_1$ represents any acid anion.

The unsymmetrical tricarbocyanine dye compounds of the invention can be prepared as follows:

One mole of an intermediate having the Formula II is reacted with one mole of an enamine salt having the Formula III to obtain a compound having the Formula IV below:

(IV) 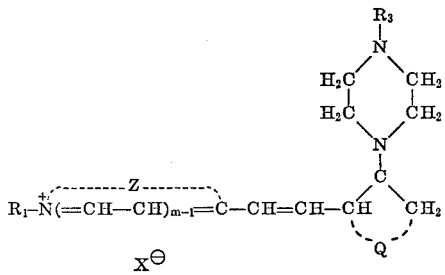

One mole of the compound of Formula IV can then be reacted with one mole of an intermediate having the Formula II but differing from the intermediate having the Formula II used to obtain a compound having the Formula IV to obtain an unsymmetrical tricarbocyanine dye included within the scope of Formula I. $R_1$, $R_3$, Q, $X^\ominus$ and Z in Formula IV have the meaning previously assigned to them.

Dyes which do not have an ethylene group linking the carbon atoms of the two methine groups adjacent the meso carbon atom of the methine linkage, are prepared by reacting 4-acetoxy-2-H-pyran-2,6(3H)dione with a compound of the formula:

(V) 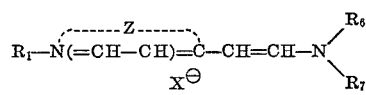

wherein $R_1$, X and Z have the meanings given above, $R_6$ represents an acyl group (e.g., acetyl) and $R_7$ represents an aryl group (e.g., phenyl), to obtain an intermediate having the formula:

(VI) 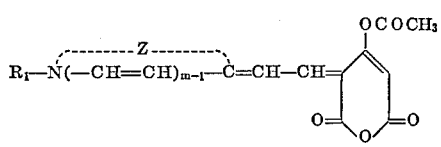

wherein $m$, $R_1$ and Z have the meanings given above, and then reacting a compound of Formula VI with a compound of Formula VII:

(VII) 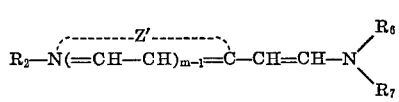

wherein $n$, $R_2$, $Z'$, $R_6$ and $R_7$ have the meanings given above, to obtain a compound of the formula:

(VIII) 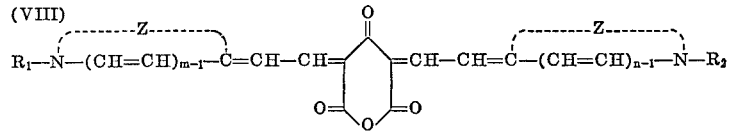

Compound VIII can then be hydrolyzed to obtain Compound IX:

(IX) 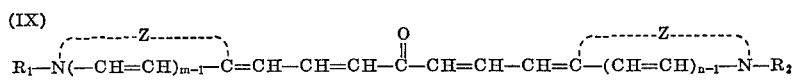

Compound IX can then be reacted, for example with methyl p-toluene sulfonate, and then with a suitable piperizinium salt to obtain a dye in accordance with this invention.

Advantageously, the condensation reactions for preparing both the symmetrical and the unsymmetrical dyes of the invention are carried out in an inert solvent medium such as N,N-dimethylacetamide, ethanol or acetic anhydride, for example, in the presence of a basic condensing agent such as a trialkylamine, e.g., triethylamine, tripropylamine, triisopropylamine, etc., N,N-dialkylanilines such as N,N-dimethylaniline, N,N-diethylaniline, etc., N-alkylpiperidines such as N-methylpiperidine, N-ethylpiperidine, etc., at elevated temperatures and preferably at refluxing temperatures of the reaction mixtures. On chilling, the dye compounds separate from the mixtures and are purified by one or more extractions or recrystallizations with appropriate solvents. In the case of the symmetrical dyes the reactants can be employed with a small excess of one or the other, i.e., greater than the stoichiometrically calculated equivalents, but preferably in the ratio of approximately 2 moles (plus a substantial excess of about 10%) of a heterocyclic compound of Formula II to each mole of the enamine salt of Formula III. In the case of the unsymmetrical dyes the reactants are employed in molar equivalents. The heterocyclic intermediates represented by Formula II are well known substances, and methods for preparing these compounds are well known to the art. The preparation of representative enamine salts coming under Formula III are described hereinafter.

In the preparation of photographic emulsions, the new dyes of the invention are advantageously incorporated in the washed, finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which case the solvent selected should be completely free from any deleterious effect on the ultimate light-sensitive materials. Methanol, isopropanol, pyridine, etc., alone or in admixtures, have proven satisfactory as solvents for the majority of my new dyes. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The concentration of the new dyes in the emulsion can vary widely, i.e., from about 5 to about 100 mgs. per liter of flowable emulsion. The specific concentration will vary according to the type of light-sensitive material in the emulsion and according to the effects desired. The suitable and most economical concentration for any given emulsion will be apparent to those skilled in the art upon making the tests and observations customarily used in the art of emulsion making. The emulsions are coated to advantage on any conventional photographic support materials such as paper, glass, cellulose acetate, cellulose acetatepropionate, cellulose nitrate, polystyrene, polyesters, polyamides, etc.

To prepare a gelatino-silver halide emulsion sensitized with one of the new dyes, the following procedure is satisfactory: A quantity of the dye is dissolved in a suitable solvent and a volume of this solution containing from 5 to 100 mgs. of dye is slowly added to about 1000 cc. of the gelatino-silver halide emulsion. With most of the new dyes, 10 to 23 mgs. of dye per liter of emulsion suffice to produce the maximum sensitizing effect with the ordinary gelatino-silver halides including silver chloride, bromide, bromoiodide, chlorobromide, chlorobromoiodide, etc. emulsions. With fine-grain emulsions, which include most of the ordinary employed gelatino-silver chloride emulsions and the like, somewhat larger concentrations of dye may be necessary to secure optimum sensitizing effect. While the preceding has dealt with emulsions comprising gelatin, it will be understood that these remarks apply generally to any emulsions wherein part or all of the gelatin is substituted by another suitable hydrophilic colloid such as mentioned above.

The above statements are only illustrative and are not to be understood as limiting the invention in any sense, as it will be apparent that the new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

In addition to the utility described hereinbefore the new tricarbocyanine dye compounds of the invention are also useful in false-color or false-sensitized photographic color films such as those described, for example, in Hanson U.S. Pat. 2,763,549 or on pp. 48, 62 and 63 of "Photo Methods for Industry" for May 1963. Insofar as false-color or false-sensitized photographic color films are concerned, the dye compounds of the invention are particularly useful in the case of false-sensitized multicolor films containing an infrared sensitive layer.

Silver halide emulsions spectrally sensitized with dyes in accordance with this invention can comprise silver chloride, silver bromine, silver bromoiodide, silver chlorobromoiodide or mixtures thereof. Such emulsions can be coarse, medium or fine grain (or mixtures thereof) and can be prepared by any of the well-known procedures, e.g., single jet emulsions, double jet emulsions. Useful emulsions include Lippmann emulsions, ammoniacal emulsions, thiocyanate or thioether ripened emulsions such as those described in Nietz et al. U.S. Pat. 2,222,264, Illingsworth U.S. Pat. 3,320,069, and McBride U.S. Pat. 3,271,157; or, cubic grain emulsions, such as those described by Kline and Moisar, Journal of Photographic Science, volume 12, page 242 et seq., or Markocki, The Spectral Sensitization of Silver Bromide Emulsions on Different Crystallographic Faces, Journal of Photographic Science, volume 13, 1965. Surface image emulsions can be used or internal image emulsions such as those described in Davey et al. U.S. Pat. 2,592,250; Lowe et al. U.S. Pat. 3,206,313; Berriman et al. U.S. Pat. 3,367,-778 and Bacon et al. Belgian Pat. 704,255. If desired, mixtures of surface and internal image emulsions can be used as described in Luckey et al. U.S. Pat. 2,996,382. Negative type emulsions can be used as well as direct positive emulsions such as those described in Leermakers U.S. Pat. 2,184,013; Kendall et al. U.S. Pat. 2,541,472; Berriman U.S. Pat. 3,367,778; Schouivenaars British Pat. 723,019; Illingsworth French Pat. 1,520,821; Ives U.S. Pat. 2,563,785; Knott et al. U.S. Pat. 2,456,953; and Land U.S. Pat. 2,861,885.

The silver halide emulsions spectrally sensitized with the dyes of this invention can be unwashed or washed to remove soluble salts. In the latter case the soluble salts can be removed by chill-setting and leaching or the emulsion can be coagulation washed, e.g., by the procedures described in Hewitson et al. U.S. Pat. 2,618,556; Yutzy et al. U.S. Pat. 2,614,928; Yackel U.S. Pat. 2,565,418; Hart et al. U.S. Pat. 3,241,969; and Waller et al. U.S. Pat. 2,489,341.

Photographic emulsions containing sensitizing dyes in accordance with this invention can be sensitized with chemical sensitizers, such as with reducing agents; sulfur, selenium or tellurium compounds; gold, platinum or palladium compounds; or combinations of these. Suitable chemical sensitization procedures are described in Shepard U.S. Pat. 1,623,499; Allen U.S. Pat. 2,399,083; McVeigh U.S. Pat. 3,297,447; and Dunn U.S. Pat. 3,297,446.

The spectrally sensitized siver halide emulsions of this invention can contain speed increasing compounds such as polyalkylene glycols, cationic surface active agents and thioethers or combinations of these as described in Piper U.S. Pat. 2,886,437; Chechak U.S. Pat. 3,046,134; Carroll et al. U.S. Pat. 2,944,900; and Goffe U.S. Pat. 3,294,540.

Silver halide emulsions containing the sensitizing dyes of this invention can be protected against the production of fog and can be stabilized against loss of sensitivity during keeping. Suitable antifoggants and stabilizers, which can be used alone or in combination, include the thiazolium salts described in Staud U.S. Pat. 2,131,038 and Allen U.S. Pat. 2,694,716; the azaindenes described in Piper U.S. Pat. 2,886,437 and Heimbach U.S. Pat. 2,444,605; the mercury salts described in Allen U.S. Pat. 2,728,663; the urazoles described in Anderson U.S. Pat. 3,287,135; the sulfocatechols described in Kennard U.S. Pat. 3,236,652; the oximes described in Carroll et al. British Pat. 623,448; nitron; nitroindazoles; the mercaptotetrazoles described in Kendall et al. U.S. Pat 2,403,927; Kennard et al. U.S. Pat. 3,266,897 and Luckey et al. U.S. Pat. 3,397,987; the polyvalent metal salts described in Jones U.S. Pat. 2,839,405; the thiuronium salts described in Herz U.S. Pat. 3,220,839; and the palladium, platinum and gold salts described in Trivelli U.S. Pat. 2,566,263 and Damschroder U.S. Pat. 2,597,915.

Photographic elements including emulsions spectrally sensitized in accordance with this invention can contain incorporated developing agents such as hydroquinones, catechols, aminophenols, 3-pyrazolidones, ascorbic acid and its derivatives, reductones and phenylenediamines, or combinations of developing agents. The developing agents can be in a silver halide emulsion and/or in another suitable location in the photographic element. The developing agents can be added from suitable solvents or in the form of dispersions as described in Yackel U.S. Pat. 2,592,368 and Dunn et al. French Pat. 1,505,778.

Silver halide spectrally sensitized in accordance with the invention can be dispersed in colloids that can be hardened by various organic or inorganic hardeners, alone or in combination, such as the aldehydes, and blocked aldehydes, ketones, carboxylic and carbonic acid derivatives, sulfonate esters, sulfonyl halides and vinyl sulfones, active halogen compounds, epoxy compounds, aziridines, active olefins, isocyanates, carbodiimides, mixed function hardeners and polymeric hardeners such as oxidized polysaccharides, e.g., dialdehyde starch, oxyguargum, etc.

Photographic emulsions spectrally sensitized with the sensitizing dyes hereof can contain various colloids alone or in combination as vehicles or binding agents. Suitable hydrophilic materials include both naturally-occurring substances such as proteins, for example, gelatin, gelatin derivatives, celluose derivatives, polysaccharides such as dextran, gum arabic and the like; and synthetic polymeric substances such as water soluble polyvinyl compounds, e.g., poly(vinylpyrrolidone) acrylamide polymers or other synthetic polymeric compounds such as dispersed vinyl compounds in latex form, and particularly those which increase the dimensional stability of the photographic materials. Suitable synthetic polymers include those described, for example, in U.S. Pats. 3,142,568 of Nottorf, issued July 28, 1964; 3,193,386 of White issued July 6, 1965; 3,062,674 of Houck, Smith and Yudelson, issued Nov. 6, 1962; 3,220,844 of Houck, Smith and Yudelson, issued Nov. 30, 1965; Ream and Fowler 3,287,289, issued Nov. 22, 1966; and Dykstra U.S. Pat. 3,411,911; particularly effective are those water-insoluble polymers of alkyl acrylates and methacrylates, acrylic acid, sulfoalkyl acrylates or methacrylates, those which have cross linking sites which facilitate hardening or curing and those having recurring sulfobetaine units as described in Canadian Pat. 774,054.

Emulsions spectrally sensitized in accordance with this invention can be used in photographic elements which contain antistatic or conducting layers, such as layers that comprise soluble salts, e.g., chlorides, nitrates, etc., evaporated metal layers, ionic polymers such as those described in Minsk U.S. Pat. 2,861,056 and 3,206,312 or insoluble inorganic salts such as those described in Trevoy U.S. Pat. 3,428,451.

Photographic emulsions containing the sensitizing dyes of the invention can be coated on a wide variety of supports. Typical supports include cellulose nitrate film, cellulose ester film (poly(vinyl acetal) film, polystyrene film, poly(ethylene terephthalate) film, polycarbonate film and related films or resinous materials, as well as glass, paper, metal and the like. Typically, a flexible support is employed, especially a paper support, which can be partially acetylated or coated with baryta and/or an alpha-olefin polymer, particulraly a polymer of an alpha-olefin containing 2 to 10 carbon atoms such as polyethylene, polypropylene, ethylenebutene copolymers and the like.

Spectrally sensitized emulsions of the invention can contain plasticizers and lubricants such as polyalcohols, e.g., glycerin and diols of the type described in Milton U.S. Pat. 2,960,404; fatty acids or esters such as those described in Robijns U.S. Pat. 2,588,765 and Duane U.S. Pat. 3,121,060; and silicone resins such as those described in Du Pont British Pat. 955,061.

The photographic emulsions spectrally sensitized as described herein can contain surfactants such as saponin, anionic compounds such as the alkyl aryl sulfonates described in Baldsiefen U.S. Pat. 2,600,831 and amphoteric compounds such as those described in Ben-Ezra U.S. Pat. 3,133,816.

Photographic elements containing emulsion layers sensitized as described herein can contain matting agents such as starch, titanium dioxide, zinc oxide, silica polymeric beads including beads of the type described in Jelley et al. U.S. Pat. 2,527,583 and Van Campen U.S. Pat.

Spectrally sensitized emulsions of the invention can be utilized in photographic elements which contain brightening agents including stilbene, triazine, oxazole and coumarin brightening agents. Water soluble brightening agents can be used such as those described in Albers et al. German Pat. 972,067 and McFall et al. U.S. Pat. 2,933,390 or dispersions of brighteners can be used such as those described in Jansen German Pat. 1,150,274 and Oetiker et al. U.S. Pat. 3,406,070.

Light sensitive photographic emulsion layers spectrally sensitized with the subject sensitizing dye can be used in photographic elements which contain light absorbing materials and filter dyes such as those described in Sawdey U.S. Pat. 3,253,921; Gaspar U.S. Pat. 2,274,782; Carroll et al. U.S. Pat. 2,527,583 and VanCampen U.S. Pat. 2,956,879. If desired, the dyes can be mordanted, for example, as described in Milton and Jones U.S. Pat. 3,282,699.

The senstizing dyes (and other emulsion addenda) can be added to the photographic emulsion from water solutions or suitable organic solvent solutions, for example with the procedure described in Collins et al. U.S. Pat. 2,921,343; Owens et al. U.S. Pat. 3,342,605; Audran U.S. Pat. 2,996,287 or Johnson et al. U.S. Pat. 3,425,835. The dyes can be dissolved separately or together, and the separate or combined solutions can be added to a silver halide emulsion, or a silver halide emulsion layer can be bathed in the solution of dye or dyes.

Photographic emulsions of this invention can be coated by various coating procedures including dip coating, air knife coating, curtain coating, or extrusion coating using hoppers of the type described in Beguin U.S. Pat. 2,681,294. If desired, two or more layers may be coated simultaneously by the procedures described in Russell U.S. Pat. 2,761,791 and Wynn British Pat. 837,095.

Emulsions spectrally sensitized as described herein are useful in colloid transfer processes such as described in Yackel et al. U.S. Pat. 2,716,059; silver salt diffusion transfer processes such as described in Rott U.S. Pat. 2,352,014, Land U.S. Pat. 2,543,181, Yackel U.S. Pat. 3,020,155 and Land U.S. Pat. 2,861,885; color image transfer processes such as described in Rogers U.S. Pats. 3,087,817; 3,185,567; and 2,983,606; Weyerts U.S. Pat.

3,253,915, Whitmore et al. U.S. Pats. 3,227,550; 3,227,551 and 3,227,552; and Land. U.S. Pats. 3,415,644 3,415,645; and imbibition transfer processes as described in Minsk U.S. Pat. 2,882,156.;

Photographic emulsions of this invention can be used in elements designed for recording print out images as described in Fallesen U.S. Pat. 2,369,449 or Bacon et al., Belgian Pat. 704,255; direct print images as described in Hunt U.S. Pat. 3,033,682 and McBride U.S. Pat. 3,287,137; elements designed for processing by heat as described in Sorensen et al. U.S. Pat. 3,152,904, 3M British Pat. 1,110,046, Stewart U.S. Pat. 3,312,550 and Colt. U.S. Pat. 3,148,122; or, in elements designed for physical development such as those described in Agfa British Pat. 920,277 and Gilman et al. British Pat. 1,131,238.

Silver halide emulsions containing the sensitizing dyes of this invention can be used in elements designed for color photography, for example, elements containing color-forming couplers such as those described in Frolich et al. U.S. Pat. 2,376,679; Vittum et al. U.S. Pat. 2,322,027; Fierke et al. U.S. Pat. 2,801,171; Godowsky U.S. Pat. 2,698,794; Barr et al. U.S. Pat. 3,227,554 and Graham U.S. Pat. 3,046,129; or elements to be developed in solutions containing color-forming couplers such as those described in Mannes and Godowsky U.S. Pat. 2,252,718; Carroll et al. U.S. Pat. 2,592,243 and Schwan U.S. Pat. 2,950,970.

Exposed photographic emulsions of this invention can be processed by various methods including processing in alkaline solutions containing conventional developing agents such as hydroquinones, catechols, aminophenols, 3-pyrazolidones, phenylenediamines, ascorbic acid-derivatives, hydroxylamines, hydrazines and the like; web processing such as described in Tregillus et al. U.S. Pat. 3,179,517; stabilization processing as described in Yackel et al. "Stabilization Processing of Films and Papers," PSA Journal, vol. 16B, August 1950, monobath processing as described in Levy "Combined Development and Fixation of Photographic Images With Monobaths," Phot., Sci. and Eng., vol. 2, No. 3, October 1958, and Barnes et al. U.S. Pat. 3,392,019. If desired, the photographic emulsions of this invention can be processed in hardening developers such as those described in Allen et al. U.S. Pat. 3,232,761; in roller transport processors such as those described in Russell U.S. Pat. 3,025,779; or by surface application processing as described in Example 3 of Kitze U.S. Pat. 3,418,132.

The silver halide emulsions spectrally sensitized by the dye combinations of this invention can be used for making lithographic printing plates such as by the colloid transfer of undeveloped and unhardened areas of an exposed and developed emulsion to a suitable support as described in Clark et al. U.S. Pat. 2,763,553; to provide a relief image as described in Woodward U.S. Pat. 3,402,045 or Spencer U.S. Pat. 3,053,658; or, to prepare a relief printing plate as described in Baxter et al. U.S. Pat. 3,271,150.

Other spectral sensitizing dyes can be used in addition to the dyes of this invention to confer additional sensitivity to the light sensitive silver halide emulsion of the photographic elements of the invention. For instance, additional spectral sensitization can be obtained by treating the emulsion with a solution of a sensitizing dye in an organic solvent or the dye may be added in the form of a dispersion as described in Owens et al. French Pat. 1,482,774. For optimum results, the dye may either be added to the emulsion as a final step or at some earlier stage. Such dyes are described, for example, in Brooker and White U.S. Pat. 2,526,632, issued Oct. 24, 1950; Sprague U.S. Pat. 2,503,776, issued Apr. 11, 1950; Brooker et al. U.S. Pat. 2,493,748; and Taber et al. U.S. Pat. 3,384,486. Spectral sensitizers which can be used with the dyes hereof include the cyanines, merocyanines, complex (tri or tetranuclear) merocyanines, complex (tri or tetranuclear) cyanines, holopolar cyanines, styryls, hemicyanines (e.g., enamine hemicyanines), oxonols and hemioxonols.

Dyes of the cyanine classes that are useful in combination with the present dyes may contain such basic nuclei as the thiazolines, oxazolines, pyrrolines, pyridines, oxazoles, thiazoles, selenazoles and imidazoles. Such nuclei may contain alkyl, alkylene, hydroxyalkyl, sulfoalkyl, carboxyalkyl, aminoalkyl, and enamine groups and may be fused to carbocyclic or heterocyclic ring systems either unsubstituted or substituted with halogen, phenyl, alkyl, haloalkyl, cyano, or alkoxy groups. The dyes may be symmetrical or unsymmetrical and may contain alkyl, phenyl, enamine or heterocyclic substituents on the methine or polymethine chain.

The merocyanine dyes which are useful in combination with the dyes of this invention may contain the basic nuclei mentioned above as well as acid nuclei such as thiohydantoins, rhodanines, oxazolidenediones, thiazolidenediones, barbituric acids, thiazolineiones, and malononitrile. These acid nuclei may be substituted with alkyl, alkylene, phenyl, carboxyalkyl, sulfoalkyl, hydroxyalkyl, alkoxyalkyl, alkylamino groups, or heterocyclic nuclei. Combinations of these dyes may be used, if desired. In addition, supersensitizing addenda which do not absorb visible light may be included; for instance, ascorbic acid derivatives, azaindenes, cadmium salts, and organic sulfonic acids as described in McFall et al. U.S. Pat. 2,933,390 and Jones et al. U.S. Pat. 2,937,089. Particularly useful supersensitizers for the present dyes are the sulfonated polynuclear aromatic compounds, silver halide reducing agents, azaindenes or combinations thereof, described in Hiller et al. U.S. patent application Ser. No. 860,394 filed Sept. 23, 1969.

The following examples are included for a further understanding of the invention.

EXAMPLE 1

3,3'-diethyl-10,12-ethylene-11-(4-methyl-1-piperazinyl) oxatricarbocyanine perchlorate

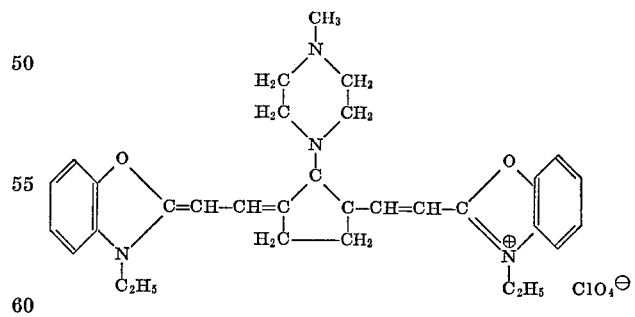

1 - cyclopentylidene-4-methylpiperazinium perchlorate (1.3 g., 1 mol) 2-(2-acetanilidovinyl)-3-ethylbenzoxazolium iodide (4.8 g., 2 mols+10%) and triethylamine (1.5 ml., 2 mols+10%) are dissolved in acetic anhydride (15 ml.) and heated at reflux, with stirring, for 10 minutes, turned into a beaker, let stand for 5 minutes at room temperature, collected crude dye on a filter and washed with ethanol. After two recrystallizations from cresol-methanol, the yield of purified dye is 0.2 g. (6%), M.P., 267–268° C. with decomposition.

EXAMPLE 2

3,3'-diethyl-10,12-ethylene-11-(4-methyl-1-piperazinyl) thiatricarbocyanine perchlorate

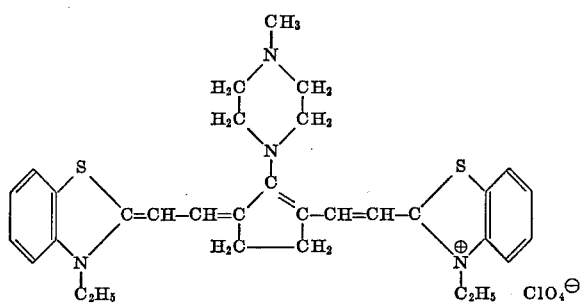

1-cyclopentylidene-4-methylpiperazinium perchlorate (1.3 g., 1 mol), 2-(2-acetanilidovinyl)-3-ethylbenzothiazolium iodide (5.0 g., 2 mols+10%) and triethylamine (1.5 ml., 2 mols+10%) are dissolved in ethanol (30 ml.) and heated at reflux for 10 minutes. After cooling to room temperature, the solid is collected on a filter, washed with methanol and dried. After two recrystallizations from cresol/methanol the yield of purified dye is 1.0 g. (31%), M.P. 261–262° C. with decomposition.

EXAMPLE 3

3,3'-diethyl-10,12-ethylene-11-(4-phenyl-1-piperazinyl)thiatricarbocyanine perchlorate

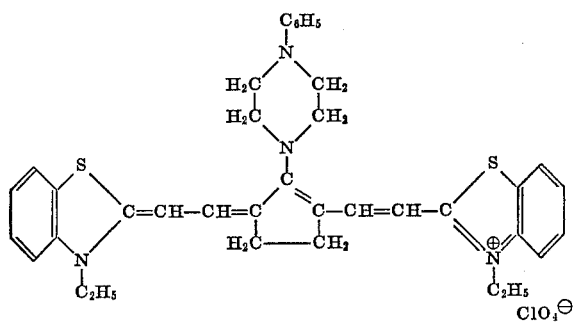

1-cyclopentylidene-4-phenylpiperazinium perchlorate (1.6 g., 1 mol), 2-(2-acetanilidovinyl)-3-ethylbenzothiazolium iodide (5.0 g., 2 mols+10%) and triethylamine (1.5 ml., 2 mols+10%) are dissolved in acetic anhydride (15 ml.) and heated at reflux for 10 minutes (with stirring). The mixture is then stirred at room temperature for 10 minutes, and then the solid is collected on a filter. The crude dye is first extracted with hot methanol and then recrystallized once from N,N-dimethylacetamide/methanol. The yield of purified dye is 1.5 g. (43%), M.P. 266–267° C. with decomposition.

EXAMPLE 4

3,3'-diethyl-10,12-ethylene-11-(4-ethyl-1-piperazinyl) oxatricarbocyanine perchlorate

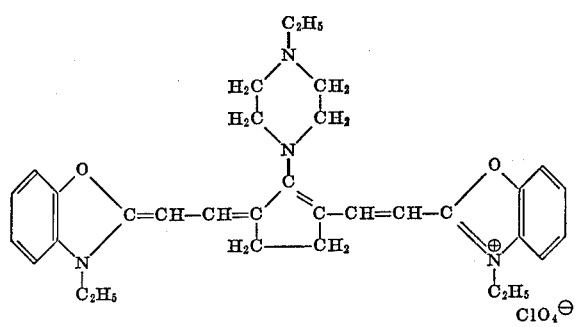

1-cyclopentylidene - 4 - ethylpiperazinium perchlorate (1.4 g., 1 mol), 2-(2-acetanilidovinyl)-3-ethylbenzoxazolium iodide (4.8 g., 2 mols+10%) and triethylamine (1.5 ml., 2 mols+10%) are dissolved in ethanol (15 ml.) and heated at reflux, with stirring, for 10 minutes. After cooling to room temperature the solid is collected on a filter, rinsed with methanol and dried. After one recrystallization from methanol, the yield of purified dye is 1.2 g. (39%), M.P. 250–251° C. with decomposition.

EXAMPLE 5

3,3'-diethyl-10,12-ethylene-11-(4-ethyl-1-piperazinyl) thiatricarbocyanine perchlorate

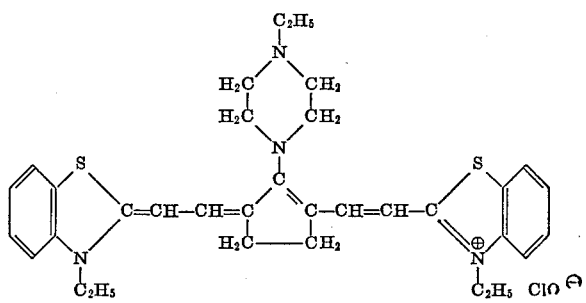

1-cyclopentylidene - 4 - ethylpiperazinium perchlorate (1.4 g., 1 mol), 2-(2-acetanilidovinyl)-3-ethylbenzothiazolium iodide (5.0 g., 2 mols+10%) and triethylamine (1.5 ml., 2 mols+10%) are dissolved in acetic anhydride (15 ml.) and heated at reflux, with stirring, for 10 minutes. After cooling at room temperature for 5 minutes, the solid is collected on a filter, washed with methanol and dried. After one recrystallization from methanol, the yield of purified dye is 0.7 g. (21%), M.P. 243–244° C. with decomposition.

EXAMPLE 6

11-(4-ethoxycarbonyl-1-piperazinyl)-3,3'-diethyl-10,12-ethyleneoxatricarbocyanine perchlorate 1-cyclopentylidene-4-ethoxycarbonylpiperazinium perchlorate (1.6 g., 1 mol), 2-(2-acetanilidovinyl)-3-ethylbenzoxazolium iodide (4.8 g., 2 mols+10%) and triethylamine (1.5 ml., 2 mols+10%) are dissolved in N,N-dimethylacetamide (10 ml.) and heated at a gentle reflux, with stirring, for 10 minutes. Turned into a beaker and diluted up to 350 ml. with hot methanol. After chilling, the solid is collected on a filter, washed with methanol and dried. After one recrystallization from methanol, the yield of purified dye is 0.8 g. (24%), M.P. 247–248° C. with decomposition.

EXAMPLE 7

11-(4-ethoxycarbonyl-1-piperazinyl)-3,3'-diethyl-10,12-ethylenethiatricarbocyanine perchlorate

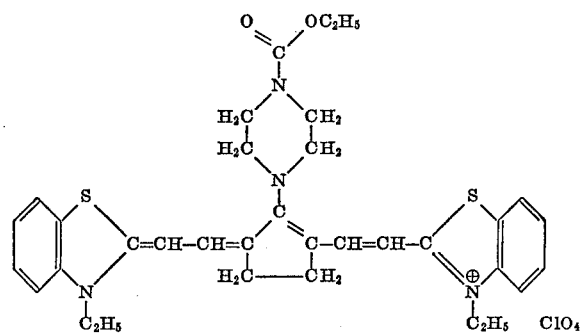

1 - cyclopentylidene - 4 - ethoxycarbonylpiperazinium perchlorate (1.6 g., 1 mol), 2-(2-acetanilidovinyl)-3-ethylbenzothiazolium iodide (5.0 g., 2 mols+10%) and triethylamine (1.5 ml., 2 mols+10%) are dissolved in N,N-dimethylacetamide (15 ml.) and heated at a gentle reflux, with stirring, for 10 minutes. Turned into a beaker and diluted up to 350 ml. with hot methanol. After cooling at room temperature for 10 minutes, the solid is collected on a filter, washed with methanol and dried. After one recrystallization from N,N-dimethylacetamide/methanol the yield of purified dye is 1.9 g. (54%), M.P. 266–267° C. with decomposition.

EXAMPLE 8

Anhydro-11-(4-ethoxycarbonylpiperazin - 1 - yl)-10,12-ethylene-3,3'-di(3 - sulfopropyl)thiatricarbocyanine hydroxide, triethylamine salt

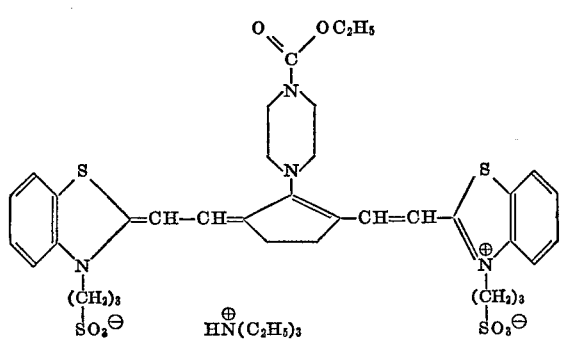

1 - cyclopentylidene - 4 - ethoxycarbonylpiperazinium perchlorate (1.6 g.), anhydro-2-(2-anilinovinyl) - 3 - (3-sulfopropyl)benzothiazolium hydroxide (4.0 g.), acetic anhydride (1.0 ml.) and triethylamine (4.2 ml.) are dissolved in N,N-dimethylacetamide (15 ml.) and heated on a mantle to reflux with stirring. When reflux is reached, the mantle is turned off and stirring of the reaction mixture is continued for 2 to 3 minutes. The reaction mixture is then filtered without being cooled prior to filtering. The dye compound formed is collected on the filter and, after one recrystallization from methanol, the yield of purified dye is 1.6 g. (36%), M.P. 235–236° C. dec.

EXAMPLE 9

Anhydro-11-(4-ethoxycarbonylpiperazin - 1 - yl) - 10,12-ethylene - 3,3' - bis(3-sulfopropyl) - 5,6;5',6' - dibenzothiatricarbocyanine hydroxide, triethylamine salt

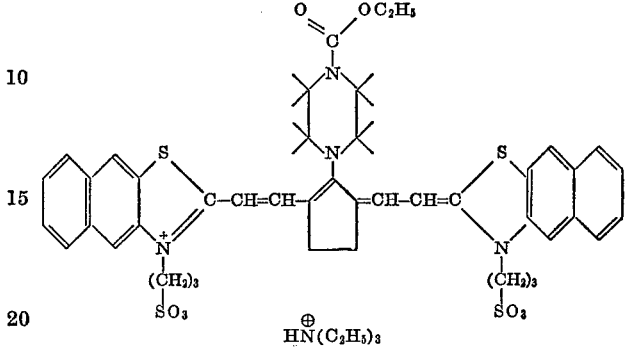

1-(5-anilinomethylene-2-phenyliminomethyl - 1 - cyclopentenyl)-4-ethoxycarbonylpiperazine (2.16 g.), anhydro-2-methyl - 3 - (3 - sulfopropyl)naphtho[2,3-d]thiazolium hydroxide (3.31 g.), acetic anhydride (1.0 ml.), and triethylamine (1.0 ml.) are dissolved in N,N-dimethylacetamide (15 ml.) and heated at a gentle reflux for 2 minutes. After cooling, the crude dye is collected on a filter and then recrystallized once from methanol containing triethylamine. The yield of purified dye is 0.9 g. (19%), M.P. 263–264° C. dec.

The dyes of the above examples are tested in a gelatin silver bromoiodide emulsion containing 0.77 mole percent iodide of the type described by Trivelli and Smith, Phot. Journal, 79, 330 (1939). The dyes, dissolved in suitable solvents, are added to separate portions of the emulsion at the concentrations indicated. After digestion at 52° C. for 10 minutes, the emulsions are coated at a coverage of 432 mg. of silver per square foot on a cellulose acetate film support. A sample of each coating is exposed on an Eastman IB Sensitometer and to a wedge spectrograph, processed for 3 minutes in the following composition:

Developer

|  | G. |
|---|---|
| N-methyl-p-aminophenol sulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |
| Water to make 1.0 liter. | | and then fixed, washed and dried. The sensitizing values obtained are shown in the following Table 1.

TABLE 1

| Dye of Example: | Dye concentration (g.) mole silver | Type of emulsion | Sensitization Range (mμ) | Maximum (mμ) |
|---|---|---|---|---|
| 1 | 0.02 | Bromoiodide | To 830 | 750 |
| 2 | 0.02 | do | 700 to 850 | 800 |
| 3 | 0.02 | do | 700 to 840 | 790 |
| 4 | 0.02 | do | 590 to 820 | 750 |
| 5 | 0.02 | do | 700 to 850 | 800 |
| 6 | 0.02 | do | 560 to 850 | 730 |
| 7 | 0.02 | do | 580 to 850 | 780 |
| 8 | 0.024 | do | 680 to 840 | 790 |
| 9 | 0.025 | do | 680 to 830 | 790 |

The following examples illustrate the preparation of certain enamine salts that are employed as intermediates in the preceding dye preparation examples.

EXAMPLE 10

1-cyclopentylidene-4-methylpiperazinium perchlorate

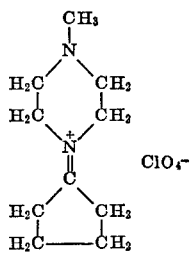

1-methylpiperazinyl hydroperchlorate (20.1 g., 1 mol) and cyclopentanone (10.1 g., 1 mol+20%) are dissolved in ethanol (75 ml.) and heated at reflux for 30 minutes. After cooling, the solid is collected on a filter, rinsed with ethanol and dried. The yield is 16.1 g. (60%), M.P. 155–158° C.

EXAMPLE 11

1-cyclopentylidene-4-phenylpiperazinium perchlorate

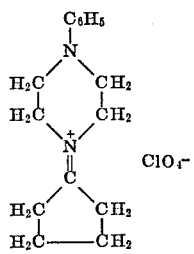

To a mixture of 1-phenylpiperazine (17.0 g., 1 mol+5%) and cyclopentanone (16.8 g., 1 mol+100%) is added 72% perchloric acid (14.0 g., 1 mol) with cooling. The mixture is then heated on a steam bath for 15 minutes. The product is precipitated by the addition of ethanol and, after chilling, it is collected on a filter and dried. The yield is 28.7 g. (87%), M.P. 185–186° C.

EXAMPLE 12

1-ethoxycarbonyl-4-ethylpiperazine

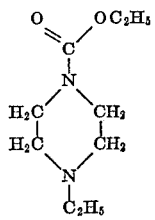

This compound is prepared in the manner described by Moore, Boyle, and Thorn, J. Chem. Soc., 1929, page 39.

EXAMPLE 13

1-ethylpiperazine

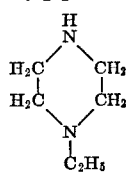

1-ethoxycarbonyl-4-ethylpiperazine (22.7 g.) is dissolved in 100 ml. of 5 N NaOH and heated at reflux, with stirring, for 4 hours. After cooling, the mixture is treated with conc. HCl until just acid. Neutralized with $Na_2CO_3$, made basic with 50% NaOH and then extracted continously with benzene for several days. Removed the benzene under reduced pressure and distilled the residue. The yield is 2.0 g. (14%), B.P. 40° C./7 mm.

EXAMPLE 14

1-cyclopentylidene-4-ethylpiperazinium perchlorate

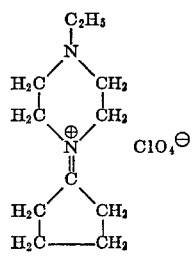

To a chilled solution of 1-ethylpiperazine (2.0 g., 1 mol) in ether (200 ml.) is added slowly 72% perchloric acid (3.0 ml.). Decanted and dissolved the residue in ethanol (25 ml.). Heated to reflux, added cyclopentanone (2.0 g., 1 mol+excess) and refluxed for 2 minutes. After chilling, the solid is collected on a filter and dried. The yield is 4.7 g. (96%). After one recrystallization from N,N-dimethylacetamide/methanol, the M.P. is 240–241° C. with decomposition.

EXAMPLE 15

1-cyclopentylidene-4-ethoxycarbonylpiperazinium perchlorate

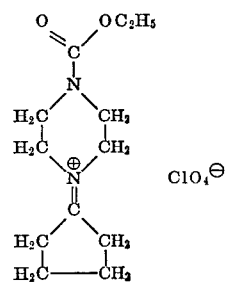

1-ethoxycarbonylpiperazine hydroperchlorate (25.9 g., 1 mol), cyclopentanone (10.1 g., 1 mol+20%) and 4 drops of 1-ethoxycarbonylpiperazine are dissolved in ethanol (50 ml.) and heated at reflux for 30 minutes. After cooling, the solid is collected on a filter, rinsed with ethanol and dried. The yield is 21.3 g. (65%), M.P. 139–141° C.

The invention has been described in detail with particular reference to preferred embodiments thereof, but, it will be understood that variations and modifications can be effected within the spirit and scope of the invention.

We claim:
1. A dye having the formula:

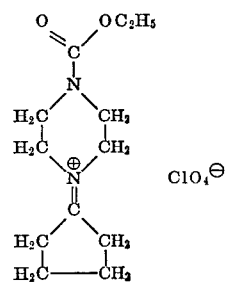

wherein $m$ and $n$ each represents a positive integer of from 1 to 2; $R_1$ and $R_2$ each represents a member selected from the group consisting of an alkyl group having 1 to 18 carbon atoms, an alkenyl group having from 2 to 4 carbon atoms; and an aryl group having 6 to 10 carbon atoms; $R_3$ represents a member selected from the group consisting of an alkyl group having 1 to 12 carbon atoms and an aryl group having 6 to 10 carbon atoms; R represents an ethylene linkage; $X^\ominus$ represents an acid anion and Z and $Z^1$ each represents the nonmetallic atoms required to complete a heterocyclic nucleus selected from the group consisting of a thiazole nucleus, a benzothiazole nucleus, a naphthothiazole nucleus, a thionaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-pyridine nucleus, a 4-pyridine nucleus, a 2-quinoline nucleus, a 4-quinoline nucleus, a 1-isoquinoline nucleus, a 3-isoquinoline nucleus, a 3,3-dialkylindolenine nucleus, an imidazole nucleus, a benzimidazole nucleus, a naphthimidazole nucleus and a benzindole nucleus.

2. A dye as defined in claim 1 wherein Z and $Z^1$ each represents the atoms to complete a nucleus selected from the group consisting of a benzothiazole nucleus, a benzoxazole nucleus and a naphthothiazole nucleus; $R_1$ and $R_2$ each represents an alkyl group having from 1 to 4 carbon atoms; and, $R_3$ represents an alkoxycarbonyl group in which the alkoxy group contains from 1 to 4 carbon atoms.

3. The tricarbocyanine dye anhydro-11-(4-ethoxycarbonylpiperazin-1-yl)-10,12-ethylene-3,3'-bis(3 - sulfopropyl)thiatricarbocyanine hydroxide triethylamine salt.

4. A dye selected from the group consisting of 3,3'-diethyl-10,12-ethylene-11-(4-methyl - 1 - piperazinyl)oxatricarbocyanine salt, 3,3'-diethyl-10,12-ethylene-11-(4-ethyl-1-piperazinyl)oxatricarbocyanine salt, and 11-(4-ethoxycarbonyl-1-piperazinyl)-3,3'-diethyl - 10,12 - ethyleneoxatricarbocyanine salt.

5. A dye selected from the group consisting of 3,3'-diethyl-10,12-ethylene-11-(4-methyl - 1 - piperazinyl)thiatricarbocyanine salt, 3,3'-diethyl-10,12-ethylene-11-(4-phenyl-1-piperazinyl)thiatricarbocyanine salt, 3,3'-diethyl-10,12 - ethylene-11-(4-ethyl-1-piperazinyl)thiatricarbocyanine salt, 11-(4-ethoxycarbonyl-1-piperazinyl)-3,3'-diethyl-10,12-ethylenethiatricarbocyanine salt, and anhydro-11-(4-ethoxycarbonylpiperazin-1-yl)-10,12 - ethylene-3,3'-di(3-sulfopropyl)thiatricarbocyanine hydroxide salt.

References Cited
UNITED STATES PATENTS

| | | | |
|---|---|---|---|
| 2,955,939 | 10/1960 | Brooker et al. | 260—240.1 X |
| 3,482,978 | 12/1969 | Fumia et al. | 96—84 |
| 3,623,881 | 11/1971 | Fumia et al. | |

JOHN D. RANDOLPH, Primary Examiner

U.S. Cl. X.R.

96—127, 133, 142; 260—240 E, 240.5, 240.8, 268 C, 268 R